United States Patent Office 2,901,136
Patented Aug. 25, 1959

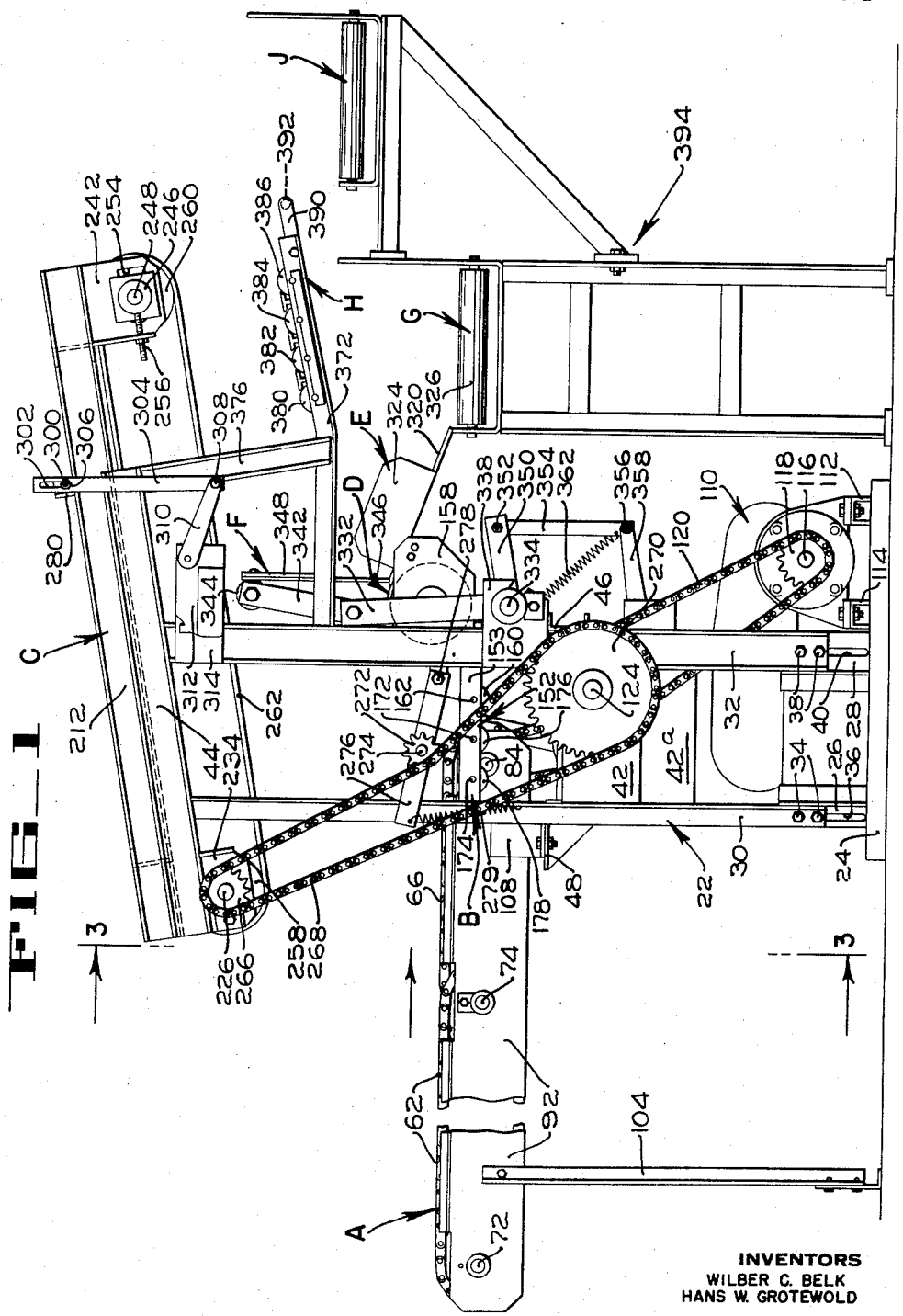

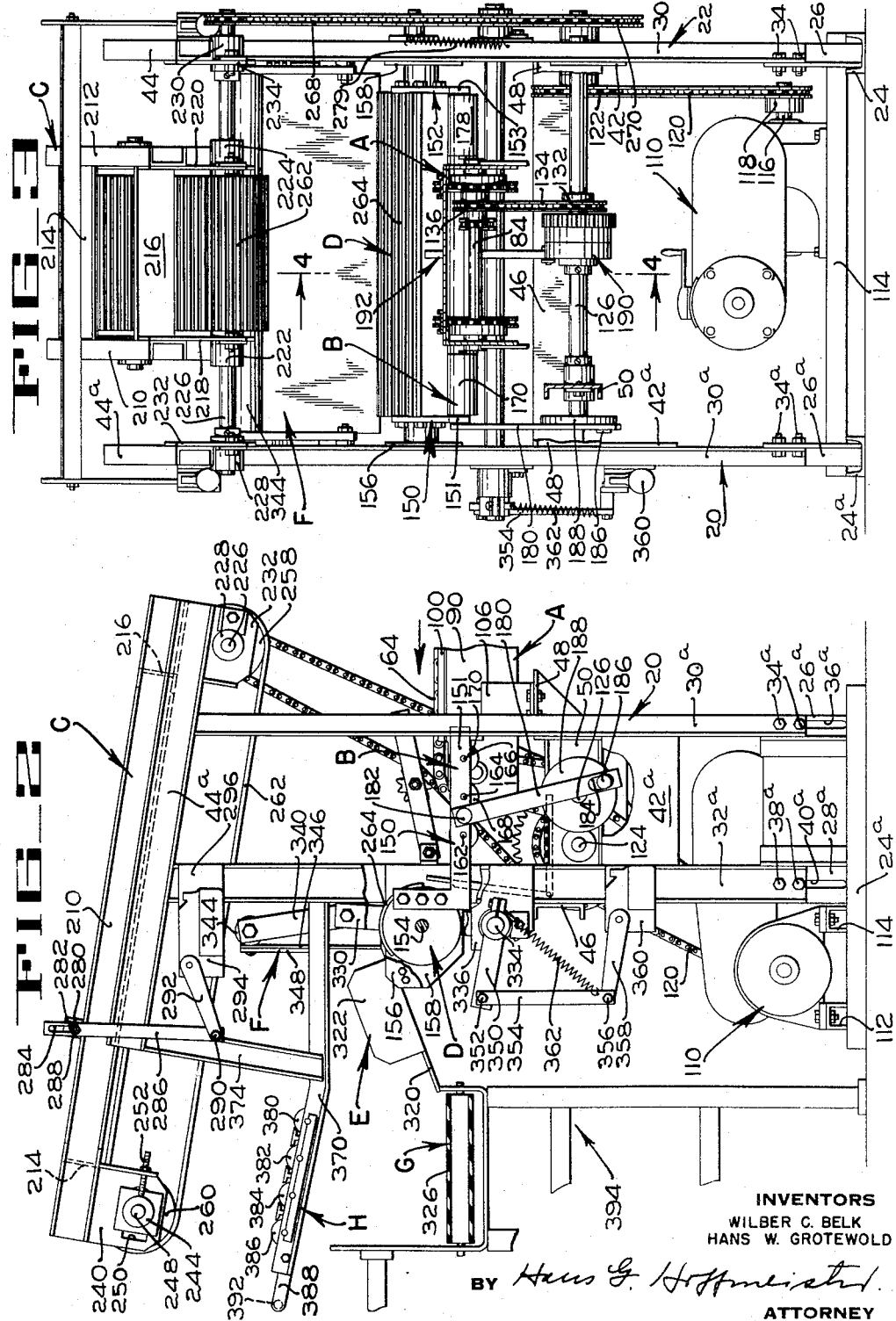

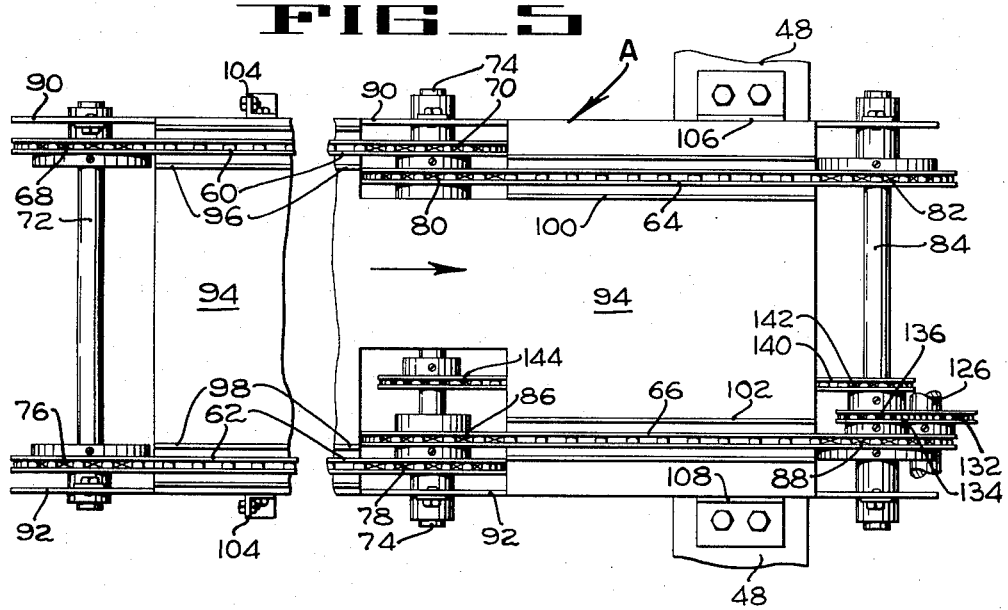

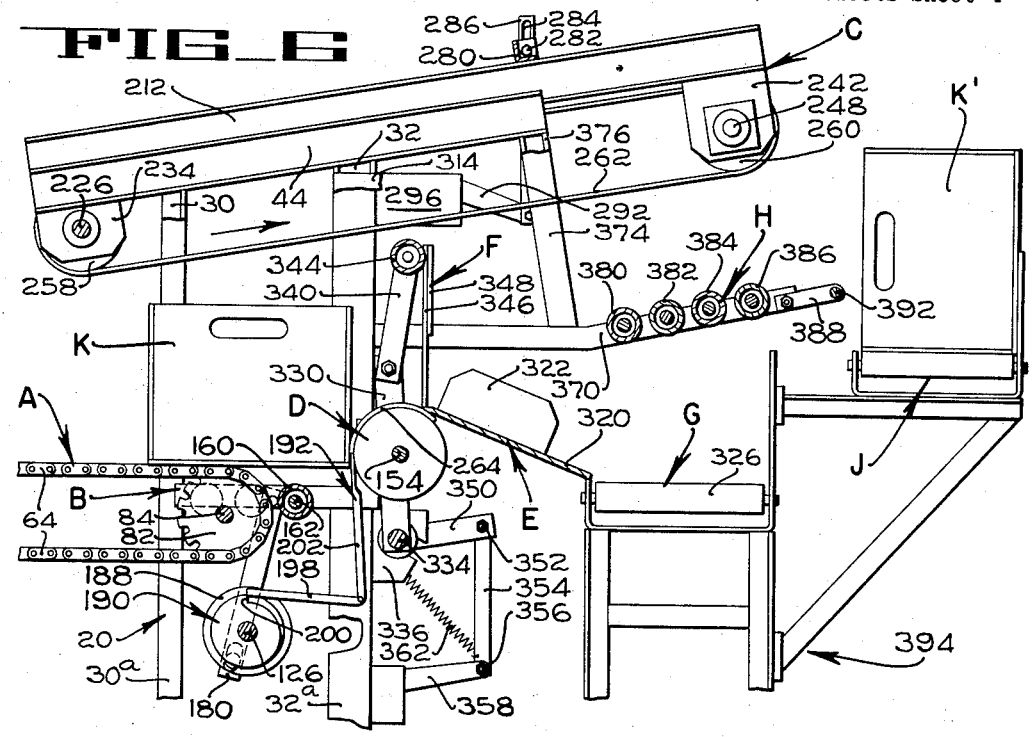
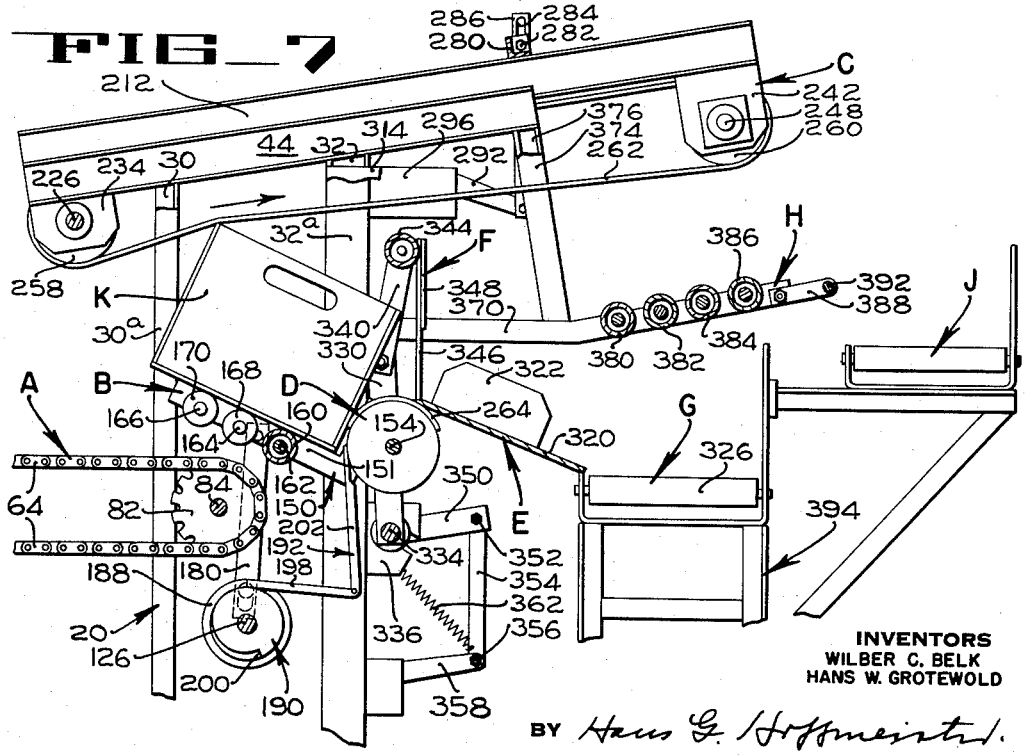

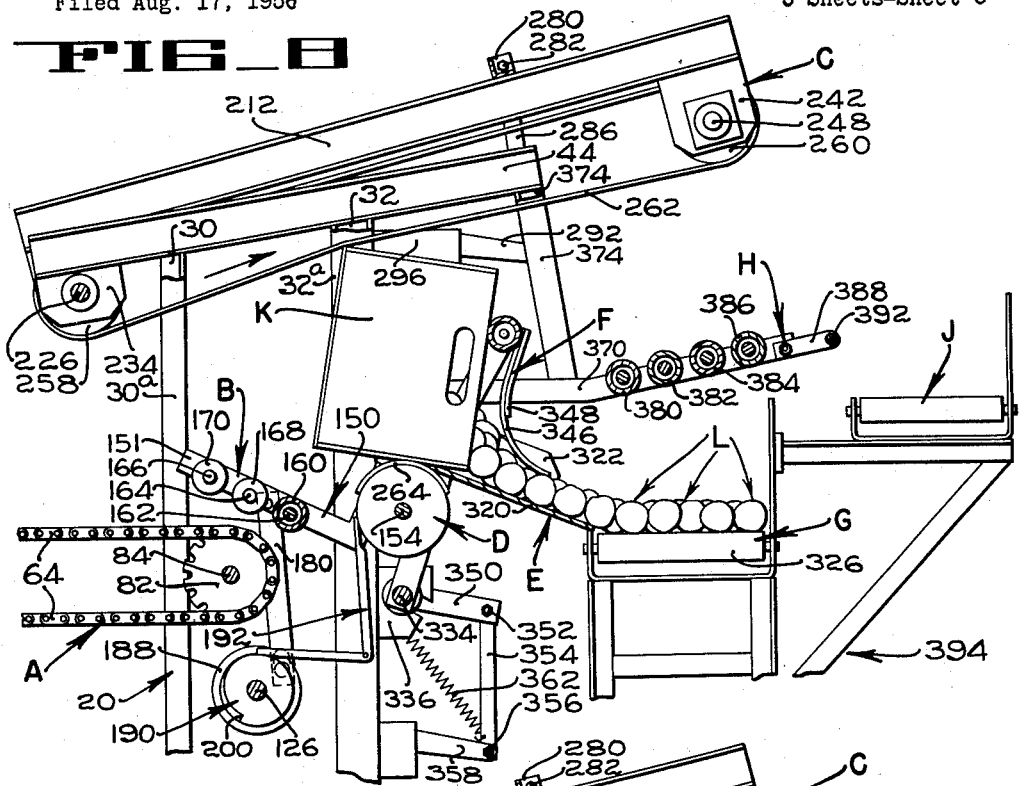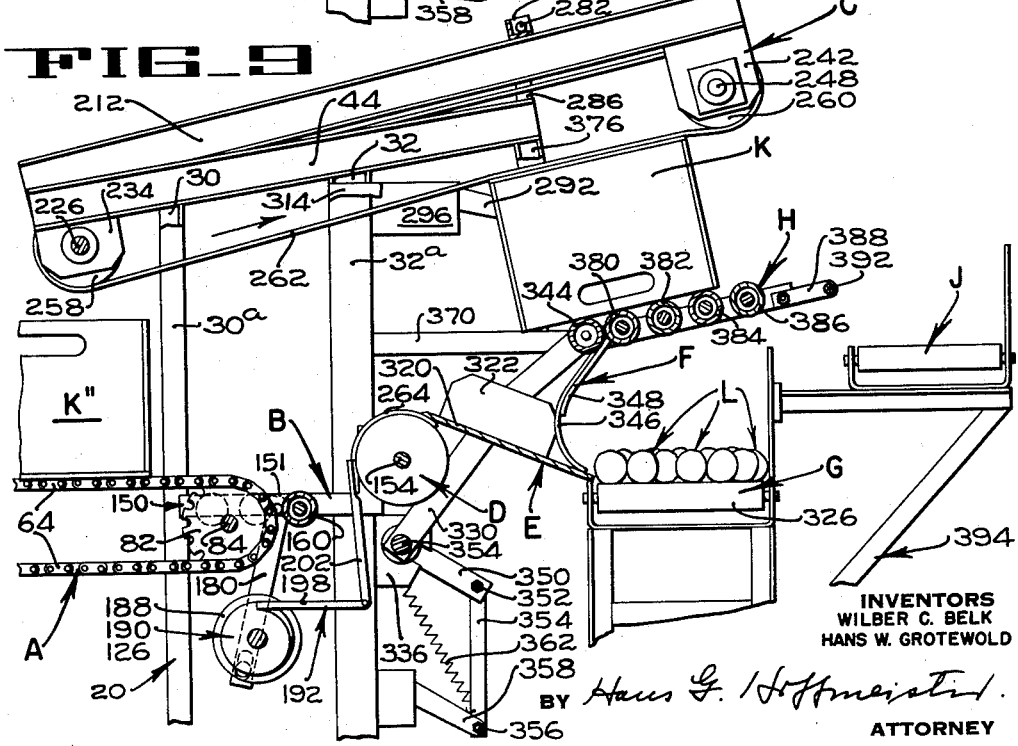

2,901,136

BOX HANDLING DEVICE

Wilber C. Belk, Lakeland, and Hans W. Grotewold, Sebring, Fla., assignors to Food Machinery and Chemical Corporation, San Jose, Calif., a corporation of Delaware Application August 17, 1956, Serial No. 604,737

7 Claims. (Cl. 214—314)

This invention pertains to the art of handling boxes and more particularly relates to an improved apparatus for rotating boxes to dump the contents therefrom.

One object of this invention is to provide a relatively simple device for dumping the contents from boxes fed individually thereto.

Another object of the invention is to provide a box handling device having a simple efficient mechanism for raising the boxes into contact with a box turning mechanism.

Another object of the invention is to provide means for separating the forwardmost box on a feed conveyor from the remainder of the boxes thereon, to prevent the second box from interfering with the box raising mechanism.

These and other objects and advantages of the present invention will become apparent from the following description and accompanying drawings in which:

Fig. 1 is a side elevation of one side of the box handling apparatus embodying the present invention.

Fig. 2 is a fragmentary side elevation of the opposite side of the box handling apparatus shown in Fig. 1.

Fig. 3 is a vertical section taken generally on line 3—3 of Fig. 1.

Fig. 4 is a fragmentary vertical section taken on line 4—4 of Fig. 3.

Fig. 5 is a plan view of the feed conveyor system with parts broken away.

Figs. 6 to 9 are a series of fragmentary side elevations, similar to Fig. 1, with the near side frame members broken away to illustrate successive positions of a box being dumped by the machine.

The device generally comprises a conveyor assembly A (Figs. 1, 2 and 3) for bringing the loaded boxes in a single file to a tilting table B which raises each of the boxes successively into contact with a box turning assembly C. The box turning assembly rotates the box about a drum D (Figs. 6 and 7) to dump the contents of the box onto a delivery chute E (Fig. 8). A flag assembly F controls the flow of articles from the box to the chute E to prevent undue bruising of the more delicate fruits and vegetables. The articles from the chute E are deposited on a fruit delivery conveyor G, and the empty boxes are carried over a roller assembly H and deposited on an empty box conveyor J.

The main frame of the machine comprises two side frames 20 and 22 (Fig. 3) which are reverse images of each other. Since the two side frames 20 and 22 are composed of similar elements oppositely disposed, only the side frame 22 will be described in detail. The corresponding elements in the side frame 20 will be denoted by the same reference numerals with the postscript "a".

The side frame 22 (Fig. 1) comprises a base member 24 having two upstanding brackets 26 and 28 fixed thereto. Two vertical members 30 and 32 are fixed to the brackets 26 and 28, respectively, and extend upwardly therefrom. The member 30 is adjustably attached to the bracket 26 by bolts 34 extending through a vertical slot 36 in the bracket. The member 32 is similarly attached to the bracket 28 by bolts 38 extending through a vertical slot 40 in the bracket 28. A plate 42 extends between the members 30 and 32 and is fixed thereto intermediate the ends thereof. A top member 44 is fixed to the upper ends of the vertical members 30 and 32 and extends longitudinally of the machine.

A first cross brace in the form of a channel member 46 (Figs. 1 and 2) extends transversely between the side frames 20 and 22 and is fixed to the vertical members 32 and 32a. Similarly, a second cross brace in the form of an angle member 48 extends between the side frames 20 and 22 and is fixed to the vertical members 30 and 30a. A longitudinally extending channel member 50 (Figs. 2 and 3) is fixed between the members 46 and 48 adjacent to, but spaced inwardly from, the side frame 20.

The feed conveyor assembly A (Figs. 1, 4 and 5) comprises a pair of primary parallel endless conveyor chains 60 and 62, at the entrance end of the conveyor, and a secondary pair of parallel endless chains 64 and 66 disposed at the discharge end of the primary chains to receive loaded boxes therefrom. The chain 60 is trained around a pair of sprockets 68 and 70 (Fig. 5) fixed to shafts 72 and 74, respectively, and the chain 62 is similarly trained around a pair of sprockets 76 and 78 fixed to the shafts 72 and 74, respectively. The chain 64 is trained around a sprocket 80 rotatably mounted on the shaft 74 and a sprocket 82 fixed to a shaft 84, and the chain 66 is trained around a sprocket 86 rotatably mounted on the shaft 74 and a sprocket 88 fixed to the shaft 84. The three shafts 72, 74 and 84 extend transversely between two side plates 90 and 92 (Figs. 3 and 5), and are rotatably mounted in suitable bearings fixed thereto.

A top plate 94 is fixed to the upper edges of the side plates 90 and 92. Suitable channel-shaped guides 96, 98, 100 and 102 (Fig. 5) are fixed to the upper surface of the top plate 94 to support and guide the upper reaches of the conveyor chains 60, 62, 64 and 66, respectively. Conventional legs such as indicated at 104 (Figs. 1 and 5) support the outermost end and intermediate portions of the conveyor assembly A. The innermost end of the conveyor assembly A is supported by a pair of brackets 106 and 108 (Figs. 1 to 5) which are fixed to the conveyor assembly side plates 90 and 92, respectively, and are bolted or otherwise connected to the frame cross member 48.

The drive mechanism for the conveyor chains 60, 62, 64 and 66 comprises a motor and gear reducing unit 110, (Figs. 1, 2 and 3) bolted to two transversely extending members 112 and 114 fixed to the base members 24 and 24a. The output shaft 116 of the motor and gear reducing unit 110 is provided with a sprocket 118 (Figs. 1 and 3) connected by a drive chain 120 with a sprocket 122 (Fig. 3) fixed to a shaft 124. The shaft 124 extends transversely between and is rotatably mounted on the side plate 42 and in the longitudinal member 50 previously described. A second shaft 126 is rotatably mounted on the plate 42 and on the longitudinal member 50 and extends parallel to the shaft 124. A spur gear 128 (Fig. 4), fixed to the shaft 124, meshes with a companion gear 130 rotatably mounted on the shaft 126. A chain 134 is trained around a sprocket 132 (Fig. 3) fixed to the spur gear 130 and around a sprocket 136 fixed to the shaft 84 which is arranged to drive the secondary chains 64 and 66 through previously mentioned sprockets 82 and 88.

The primary chains 60 and 62 are driven at a slower linear speed than the chains 64 and 66 by a chain 140 trained around a relatively small sprocket 142 fixed to the shaft 84 and a relatively large sprocket 144 fixed to the shaft 74. The shaft 74 drives the chains 60 and 62 (Fig. 5) through the previously mentioned sprockets 70 and 78.

From the foregoing description, it may be seen that as the boxes are moved inwardly by the primary conveyor chains 60 and 62, the boxes are successively picked up by the faster moving secondary chains 64 and 66 and moved away from the following boxes to provide spacing therebetween.

The innermost end of the feed conveyor assembly A is received between the outer forked end of the table assembly B in the manner best seen in Figs. 2 and 3. The table B comprises two parallel L-shaped members 150 and 152 bolted or otherwise secured to the opposite ends of the drum D which is fixed to a laterally extending shaft 154 (Fig. 2) rotatably mounted between two brackets 156 and 158 fixed to the vertical frame members 32a and 32, respectively. An arm 151 of the member 150, and an arm 153 (Fig. 3) of the member 152 extend parallel to and slightly below the upper reaches of the conveyor chains 64 and 66 (Figs. 1, 2 and 4). A rearmost roller 160 is rotatably mounted on a shaft 162 fixed to and extending between the horizontal arms 151 and 153. Two stub shafts 164 and 166 are fixed to the arm 151 at spaced points forwardly of the shaft 162 and extend inwardly from the arm 151. A pair of short rollers 168 and 170 are rotatably mounted on the shafts 164 and 166, respectively. Similarly, a pair of stub shafts 172 and 174 (Fig. 1) are fixed to the arm 153 at spaced points forwardly of the shaft 162 and extend inwardly from the arm. A pair of rollers 176 and 178 are rotatably mounted on the shafts 172 and 174, respectively.

The actuating mechanism for swinging the table assembly B upwardly to move a box into contact with the turning assembly C comprises a connecting link 180 (Figs. 2 and 3) pivotally connected at one of its ends by a pin 182 to the arm 151. The other end of the link 180 is provided with a longitudinally extending slot 184 which embraces a crank pin 186 fixed to a disc 188 secured on the shaft 126 previously described. A one-revolution clutch assembly 190 (Figs. 3 and 4) is adapted to clutch the shaft 126 to the continuously rotating gear 130 for one revolution of the shaft 126 each time the clutch is actuated. A bell crank type trip lever 192 (Fig. 4) is pivotally mounted by a pin 194 to a bracket 196 fixed to the frame member 46. One arm 198 of the bell crank 192 engages a shoulder 200 on the clutch assembly 190 and normally holds the clutch disengaged. The other arm 202 of the bell crank 192 extends upwardly into the path of the movement of the boxes being delivered by the feed conveyor assembly A.

When a box contacts the arm 202 and rotates the bell crank 192 from the position shown in full lines in Fig. 4 to that shown in dot-dash lines, the clutch 190 engages the shaft 126 and starts it rotating. As the shaft 126 rotates, the crank pin 186 (Fig. 2) first takes up the lost motion provided by the slot 184 and then raises the link 180 to rotate the table B upwardly about the axis of the drum D. As soon as the table starts to move, the box is moved away from the arm 202 thus permitting the bell crank 192 to return to its full line position whereby the arm 198 will engage the shoulder 200 upon completion of one revolution of the shaft 126 to again disengage the clutch 190.

When the table B is raised in the manner described above, the rollers 160, 168, 170, 176 and 178 on the table engage the bottom of the box and lift the box from the conveyor chains 64 and 66 into contact with the box turning mechanism C (Figs. 1, 2 and 3). The box turning mechanism C comprises a frame having two spaced longitudinally extending channel members 210 and 212 connected together by two cross members 214 and 216. Two depending brackets 218 and 220 (Figs. 2 and 3) are fixed to the forward ends of the members 210 and 212 and, at their lower ends, the brackets carry suitable bearings 222 and 224 which rotatably embrace a shaft 226 which, in turn, is rotatably mounted in suitable bearings 228 and 230 mounted on the lower ends of two brackets 232 and 234 fixed to the top longitudinal members 44a and 44 of the side frames 20 and 22, respectively. Two depending brackets 240 (Fig. 2) and 242 (Fig. 1) are fixed to the rear ends of the members 210 and 212, respectively, and support two bearings 244 and 246, respectively, which, in turn, rotatably support an idler shaft 248. It should be noted that the bearing 244 (Fig. 2) is slidably mounted in a slot 250 in the bracket 240 and a threaded bolt 252 is provided to adjustably position the bearing forwardly and rearwardly relative to the bracket 240. The bearing 246 (Fig. 1) is similarly slidable within a slot 254 in the bracket 242 and is adjustable relative to the bracket by a threaded bolt 256. A driving drum 258 (Fig. 2) is fixed to the shaft 226 between the brackets 218 and 220 and an idler drum 260 is fixed to the shaft 248 between the brackets 240 and 242. An endless belt 262 is trained around the drums 258 and 260. It will be noted from Fig. 3 that the belt 262 is provided on its outer portion with an anti-slip surface and that a piece of material 264 having a similar anti-slip surface is fastened to the upper portion of the drum D (Figs. 3 and 4) for purposes which will presently become apparent.

One end of the shaft 226 is provided with a sprocket 266 (Fig. 1) connected by a drive chain 268 to a large driving sprocket 270 (Figs. 1 and 4) fixed to the previously mentioned continuously rotating shaft 124. Thus, during operation of the machine, the turning belt 262 is continuously driven. An idler sprocket 272 engages the chain 268 intermediate the sprockets 266 and 270. The idler sprocket 272 is rotatably mounted on a stub shaft 274 fixed to an arm 276 pivotally mounted at one of its ends on a pin 278 fixed to the side frame 22. A spring 279 normally urges the arm 276 in a direction to take up any slack in the chain 268.

The pivotal action of the box turning assembly C about the axis of the shaft 226 is controlled by a shock absorber assembly comprising a bar 280 fixed to the upper surfaces of the frame members 210 and 212 (Figs. 1, 2 and 3) and extending transversely thereof. One end of the bar 280 (Fig. 2) is provided with a bolt 282 which extends through an elongated slot 284 in one end of a link 286 and is retained therein by a nut 288. The other end of the link 286 is pivotally connected by a pin 290 to the outer end of an arm 292 of a shock absorber unit 294 mounted on a bracket 296 fixed to the vertical member 32a of the side frame 20.

The opposite end of the bar 280 (Fig. 1) is provided with a bolt 300 extending through an elongated slot 302 in one end of a link 304 and retained therein by a nut 306. The opposite end of the link 304 is pivotally connected by a pin 308 to an arm 310 of a shock absorber unit 312 mounted on a bracket 314 fixed to the vertical member 32 of the side frame 22.

When a box is raised by the tilting of the table B, the rearmost side of the box will be in contact with the surface of the drum D and the uppermost portion of the box will contact the continuously moving belt 262 and be moved rearwardly thereby to rotate the box about the drum D to dump the contents thereof onto the chute E, the upper end of which is fixed to the previously mentioned brackets 156 and 158 adjacent the rear portion of the drum D. The chute E comprises a bottom portion 320 and two upwardly extending side portions 322 (Fig. 2) and 324 (Fig. 1). The lower end of the chute E is adjacent the discharge conveyor G which comprises an endless belt 326 (Fig. 2).

When the boxes are dumped in the manner described above, the discharge of the contents thereof onto the chute E is controlled by the flag assembly F. The flag assembly comprises a pair of transversely spaced arms 330 (Fig. 2) and 332 (Fig. 1), the lower ends of which are fixed to a transversely extending shaft 334 rotatably mounted in suitable bearings on brackets 336 and 338 fixed to the vertical members 32a and 32 of the side frames 20 and 22, respectively. A pair of extension arms 340 and 342 are connected to the upper ends of the arms 330 and 332, respectively, and extend generally upwardly therefrom. A rod 344 connects the upper ends of the extension arms 340 and 342 (Figs. 1, 2 and 3), and a flexible flag member 346 is fixed to the rod 344 and extends downwardly therefrom. A backing member 348, somewhat less flexible than the flag member 346, is fixed to the rod 344 and extends downwardly therefrom adjacent the rear surface of the flag member 346. The backing member 348 is approximately one-half the length of the flag member 346.

As best seen in Fig. 2, an arm 350 is fixed to one end of the shaft 334 and extends rearwardly therefrom. The outer end of the arm 350 is pivotally connected by a pin 352 to one end of a link 354, the other end of which is pivotally connected by a pin 356 to the outer end of an arm 358 of a shock absorber 360 mounted on the member 32a of the side frame 20. A tension spring 362 is connected between the pin 356 and the bracket 336 and acts through the link 354, the arm 350, the shaft 334 and arms 330 and 340 to normally urge the flag assembly F clockwise as viewed in Fig. 2 to its upright position shown therein but permits the assembly to be moved counterclockwise by a box being rotated about the drum D.

After the contents of the box have been dumped onto the chute E, the box is moved by the belt 262 over the rod 344 of the flag assembly F onto the roller assembly H. The roller assembly comprises two arms 370 and 372 extending generally horizontally rearwardly from and fixed to the vertical members 32a and 32 of the side frames 20 and 22, respectively. A pair of braces 374 and 376 are fixed to the arms 370 and 372, respectively, intermediate the ends thereof and extend upwardly therefrom with their upper ends fixed to the top longitudinal frame members 44a and 44, respectively. A series of spaced rollers 380, 382, 384 and 386 extend between and are rotatably mounted on the arms 370 and 372. A pair of extension arms 388 and 390 are fixed to and extend rearwardly from the arms 370 and 372, respectively, and a rod 392 is fixed between the rearmost ends of the arms 388 and 390. The empty box is carried over the rollers 380, 382, 384 and 386 and over the rod 392 by the belt 262 and drops onto the box discharge conveyor J (Fig. 1). The box discharge conveyor J is indicated in Fig. 1 and may be of any suitable type such as a belt conveyor or an inclined conveyor comprising a plurality of spaced transversely extending rollers. A suitable framework indicated generally at 394 supports both the fruit discharge conveyor G and the empty box discharge conveyor J.

In the operation of the device, the boxes to be dumped are placed on the end of the feed conveyor assembly A remote from the dumping machine and are carried toward the machine in single file by the chains 60 and 62 (Fig. 5). As the boxes move toward the machine the first box K progresses onto the faster moving chains 64 and 66 and is moved away from the succeeding box and moves to a position above the table B (Fig. 6) and against the drum D. When the box K reaches the position illustrated in Fig. 6, it strikes the arm 202 of the bell crank trip lever 192 and rotates the lever clockwise, moving the arm 198 upwardly to disengage the shoulder 200 and permit the clutch 190 to engage the shaft 126. When the shaft 126 rotates, it rotates the crank disc 188 and, through the crank pin 186 and the link 180, raises the table B to the position shown in Fig. 7. In this position of the table, the rearmost side of the box K is in engagement with the anti-slip material 264 on the drum D and the uppermost corner of the box K is in engagement with the constantly moving belt 262. The movement of the belt 262 rotates the box clockwise, as viewed in Fig. 7, about the drum D to the position illustrated in Fig. 8.

In this position it will be noted that the open end or top of the box K has contacted the rod 344 of the flag assembly F and rotated said assembly about the axis of its supporting shaft 334. It will also be noted that the articles L are spilling from the box onto the chute E under the control of the flag 346.

Continued movement of the belt 262 of the turning assembly C causes the flag assembly F to continue rotation about its shaft 334 until the rod 344 lies close adjacent the roller 380 on the roller assembly H in the manner illustrated in Fig. 9. The box K is then carried by the belt 262 over the rod 344 and the roller assembly H and drops off the end thereof onto the box discharge conveyor in the manner illustrated with the preceding box K' in Fig. 6.

While the box K is progressing through the device in the manner described above, the succeeding box K'' is being advanced by the conveyor assembly A and may be seen approaching the table B in Fig. 9.

From the foregoing description, it may be seen that we have provided a relatively simple and efficient mechanism for dumping the contents of boxes.

While a preferred embodiment of the invention is disclosed herein, it should be noted that various changes may be made therein without departing from the spirit of the invention as defined in the appended claims.

Having thus described our invention, what we claim and desire to secure by Letters Patent is:

1. A box dumping device comprising a pivot drum about which the boxes are rotated for dumping, a box raising table secured to and extending forwardly from said drum and mounted for rotation about the axis thereof, means for swinging said table upwardly from a box receiving position to an upwardly inclined position, means responsive to the presence of a box above said table in a position to be tilted for actuating said table swinging means, a feed conveyor for feeding boxes successively against said drum and above said table, a box turning belt above said drum and said box raising table and adapted to be contacted by an upper portion of a box on said table when said table is raised and to cooperate with said pivot drum to rotate said box about the surface of said drum, and drive means operatively connected to said table and to said belt and arranged to swing said table upwardly to move a box into engagement with said belt and to thereafter simultaneously lower said table to box receiving position and drive said belt in a direction to continue the rotation of the box about the surface of the drum.

2. A box dumping device comprising a pivot drum about which the boxes are rotated for dumping, a box raising table rigid with said drum and extending forwardly therefrom and mounted for rotation about the axis of said drum, means for raising said table, means reponsive to the presence of a box adjacent said drum and above said table for actuating said table raising means, a feed conveyor for feeding boxes successively against said drum and above said table, a box turning belt above said drum and said box raising table and adapted to be contacted by an upper portion of a box on said table when said table is raised to remove the box from said table and to cooperate with said pivot drum to continue to rotate said box about the surface of said drum as the table is being lowered, and means operatively connected to said table and to said belt for driving said box turning belt and for raising said table.

3. A box dumping device comprising a pivot drum about which the boxes are rotated for dumping, a box raising table rigid with said drum and extending forwardly therefrom and mounted for rotation about the axis of said drum, means for raising said table, means responsive to the delivery of a box against the drum and in spaced relation above said table for actuating said table raising means, a fed conveyor assembly for feeding boxes successively to a position against said drum and above said table, a product discharge chute adjacent the rear of said drum, a box turning belt above said drum and said box raising table and adapted to be contacted by an upper portion of a box on said table when said table is raised to remove the box from said table and to cooperate with said pivot drum to continue to rotate said box about said drum into dumping relation with said chute, and means for driving said box turning belt.

4. A box dumping device comprising a pivot drum about which boxes may be rotated for dumping the contents therefrom, a conveyor for successively feeding boxes into abutting relation against said drum, a box tilting table secured to and projecting outwardly from said drum and arranged to extend under a box disposed in abutting relation with said drum, means responsive to the presence of a box against said drum to pivot said drum and move said tilting table from a substantially horizontal position below said box to a position wherein the box is tilted, and a box turning belt above said drum and said box raising table and adapted to be contacted by an upper portion of the box on said table when said table is pivoted to box tilting position, said belt being arranged to continue the pivoting of said box to dumping position as said table returns to said horizontal position for receiving a second box from said conveyor.

5. A box dumping device comprising a pivot drum about which the boxes may be rotated for dumping, a feed conveyor for feeding boxes successively against said drum, a box raising table rigid with and extending tangentially outwardly from said drum, said table being normally positioned parallel to but slightly lower than said conveyor with one end of said conveyor interposed between the ends of said table, means responsive to the presence of a box against said drum to pivot said drum and move said table from said normal position below said conveyor to a raised position wherein the table and a box supported thereon are inclined, a box turning belt above said drum and said box raising table and adapted to be contacted by an upper portion of the box on said table when said table is raised and to cooperate with said pivot drum to rotate said box about the axis of said drum into dumping position, a product discharge chute adjacent said drum for receiving the product from said box, and a flexible flag arranged to be engaged by said box and to cooperate with said chute to control the rate of product flow from the box.

6. A box dumping device comprising a pivot drum about which the boxes may be rotated for dumping, a feed conveyor for feeding boxes successively against said drum, a box raising table rigid with and extending tangentially outwardly from said drum and arranged to receive a box from said conveyor, means responsive to the presence of a box against said drum to pivot said drum and move said table from a position in which the table is substantially horizontal to a raised position where the table and the box are inclined, a box turning belt above said drum and said box raising table and adapted to be contacted by an upper portion of the box on said table when said table is raised and to cooperate with said pivot drum to rotate said box about the axis of said drum into dumping position, a product discharge chute adjacent said drum for receiving the product from said box, a pair of arms adjacent the ends of said drum and supported for pivotal movement toward and away from said conveyor, a rod connecting the upper ends of said arms and positioned in the path of movement of the box to be contacted and pivoted thereby to a position below the box to permit passage of the box, a yieldable flag on said rod arranged to cooperate with said chute to gently guide the product into said chute, and resilient means normally urging said rod into the path of movement of the boxes.

7. A box dumping device comprising a pivot drum about which boxes are rotated for dumping, a box tilting table rigid with and extending forwardly from said drum and mounted for rotation about the axis thereof, a box turning belt above said drum and said box raising table and adapted to be contacted by an upper portion of a box on the table when the table is tilted and to cooperate with said pivot drum to rotate said box about the surface of said drum, and drive means operatively connected to said table and to said belt and arranged to rotate the table and said drum in one direction to move the box into engagement with said belt and to thereafter simultaneously drive said belt in a direction to continue rotation of the box about the surface of said drum and to rotate said table and said drum in the opposite direction to apply a supplemental turning force to the box.

References Cited in the file of this patent
UNITED STATES PATENTS

| | | |
|---|---|---|
| 1,295,195 | Parker | Feb. 25, 1919 |
| 1,509,254 | Pilley | Sept. 23, 1924 |
| 1,907,458 | Stevenson | May 9, 1933 |
| 1,976,855 | McKee et al. | Oct. 16, 1934 |
| 2,713,430 | Verrinder | July 19, 1955 |